(12) United States Patent
Yata

(10) Patent No.: US 7,548,269 B2
(45) Date of Patent: Jun. 16, 2009

(54) SYSTEM FOR AUTOFOCUSING A MOVING OBJECT

(75) Inventor: Kunio Yata, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 572 days.

(21) Appl. No.: 11/042,049

(22) Filed: Jan. 26, 2005

(65) Prior Publication Data
US 2005/0162540 A1 Jul. 28, 2005

(30) Foreign Application Priority Data
Jan. 27, 2004 (JP) ............................. 2004-018430

(51) Int. Cl.
*H04N 5/232* (2006.01)
(52) U.S. Cl. ..................... 348/352; 348/349; 348/346
(58) Field of Classification Search ................. 348/345, 348/352, 353, 373–375
See application file for complete search history.

(56) References Cited

U.S. PATENT DOCUMENTS 5,739,857 A * 4/1998 Kaneda ...................... 348/349
7,250,974 B2 * 7/2007 Koyanagi .................... 348/345
2003/0117516 A1 * 6/2003 Ishida et al. ................ 348/348

FOREIGN PATENT DOCUMENTS

| JP | 60-253887 | 12/1985 |
|---|---|---|
| JP | 61-39011 | 2/1986 |
| JP | 5-80248 | 4/1993 |
| JP | 6-22195 | 1/1994 |
| JP | 60-245132 | 9/1994 |
| JP | 2000-188713 | 7/2000 |
| JP | 2002-365519 A | 12/2002 |

* cited by examiner

*Primary Examiner*—Tuan V Ho
(74) *Attorney, Agent, or Firm*—Birch, Stewart, Kolasch & Birch, LLP

(57) ABSTRACT

The present invention provides an autofocus system for controlling the focus of a taking lens by specifying a subject to be autofocused within an AF area, which is part of the field of view of a camera, and automatically focusing on the subject, comprising: a target subject specifying device which specifies a target subject to be focused, a target subject movement detection device which detects the movement of the target subject specified by the target subject specifying device, within the field of view, and an AF-area altering device which alters the extent of the AF area to track the movement of the target subject detected by the target subject movement detection device.

9 Claims, 4 Drawing Sheets

SYSTEM FOR AUTOFOCUSING A MOVING OBJECT

BACKGROUND OF THE INVENTION

1. Field of the Invention

The present invention relates to an autofocus system, and in particular to an autofocus system which automatically moves the position (region) of interest for autofocus (AF) within the field of view of a camera to track a desired object, allowing the system to focus on the object.

2. Related Art

An imaging system like a television camera in which subject images are converted to electrical signals (image signals) through an imaging element (such as CCD) generally employs a contrast-detect method as an autofocus (hereinafter referred to as "AF") system. The contrast-detect method detects the contrast of a subject image from the image signals captured by the imaging element, controls the focus of the taking lens such that the contrast is highest, and thereby automatically achieves the best focus for the subject.

In an AF system such as a contrast-detect AF method, it is a common practice to process only the subject within part of the field of view of the camera, rather than processing the entire subject within the field of view. A contrast-detect AF system limits the region of interest for AF to part of the subject by extracting image signals of the region of interest for AF from image signals captured through the entire imaging area of the imaging element and controlling the focus such that the contrast of the image signals of the extracted region is highest. As used herein, a subject area to be autofocused within the field of view of the camera, or a subject image area to be autofocused within the image captured by the camera is referred to as an AF area, and a frame indicative of the contour of an AF area is referred to as an AF frame. An example of an AF frame is described in Japanese Patent Application Laid-open No. 2002-365519.

If a single AF area is set at a predetermined fixed position within the field of view, a rectangular AF area is normally positioned in the center of the field of view. It is also known, however, that an operator can specify and change the position of the AF area. As used herein, a point in the field of view (or image to be captured) for determining the position of an AF area in the field of view (or image to be captured) (for example, the position of the center point or any one of the four corner points of a rectangular AF area) is referred to as an AF point. When an operator uses a manipulation unit to specify an AF point in the operation of a television camera and the like, a trackball or a joystick, through which the operator can send commands to move the AF point horizontally and vertically, is used as a manipulation unit.

SUMMARY OF THE INVENTION

However, even if the AF point is changeable, certain effort and carefulness are still required to operate a manipulation unit such as a trackball or a joystick for moving the AF point in response to the movement of the object when the subject to be focused on is moving on the screen. Especially if the object is moving fast on the screen, there is a problem that it is difficult to move the AF point in response to the movement of the object through the operation of the manipulation unit.

The present invention has been made in view of the above facts. It is an object of the present invention to provide an autofocus system capable of keeping autofocusing on a desired object moving on the screen, even on a fast-moving object, without efforts by the operator.

To achieve the above object, a first aspect of the present invention provides an autofocus system for controlling the focus of a taking lens by specifying a subject to be autofocused within an AF area, which is part of the field of view of a camera, and automatically focuses on the subject, comprising a target subject specifying device which specifies a target subject to be focused, a target subject movement detection device which detects the movement of the target subject specified by the target subject specifying device, within the field of view, and an AF-area altering device which alters the extent of the AF area to track the movement of the target subject detected by the target subject movement detection device. According to the first aspect of the present invention, by specifying a target subject (object) to be focused, the movement of the object is automatically detected and the extent of the AF area (e.g., the AF point) is altered in keeping track of the movement of the object, enabling the system to keep focusing on the desired object moving on the screen without forcing the operator to alter the extent of the AF area. The system can also keep focusing on a fast-moving object.

According to an autofocus system of a second aspect of the present invention, in the first aspect of the present invention, the target subject movement detection device captures a subject image in the field of view of the camera through an imaging device and detects the movement of the target subject based on the captured image. That is, the detection of the movement of the target subject to be focused is performed based on images (image signals) captured through the imaging device.

According to an autofocus system of a third aspect of the present invention, in the second aspect of the present invention, the target subject movement detection device comprises a storing device which captures a target subject image specified by the target subject specifying device through the imaging device and stores the target subject image, and the movement of the target subject in the field of view is detected by detecting a pattern of the image stored in the storing device from among the images of the field of view of the camera captured through the imaging device. That is, by storing a target subject image to be focused as a reference pattern, the position to which the target subject has moved within the field of view can be detected with the aid of a pattern matching process.

According to an autofocus system of a fourth aspect of the present invention, in the second or third aspect of the present invention, the autofocus system performs focusing based on the contrast of an image of the AF area captured through the imaging device. That is, the present system employs a so-called contrast-detect autofocus method, and an imaging device used to capture images in the present autofocus method is also used in the target subject movement detection device which detects the movement of the target subject.

According to an autofocus system of a fifth aspect of the present invention, in the second, third, or fourth aspect of the present invention, the imaging device is a separate imaging device from a primary imaging device of the camera. Providing an imaging device used for autofocus separately from a primary imaging device of the camera offers an advantage in that the cycle time of the image acquisition can be reduced compared to that of the primary imaging device of the camera, allowing the system to adapt to a faster-moving target subject.

In accordance with the autofocus systems of the present invention, the AF area automatically tracks a desired object, enabling the system to keep focusing even on a fast-moving object on the screen without forcing the operator to alter the AF area (such as the position thereof) manually.

DETAILED DESCRIPTION OF THE PREFERRED EMBODIMENTS

Preferred embodiments of an autofocus system according to the present invention will be described below in detail with reference to the accompanying drawings.

Figure 1:
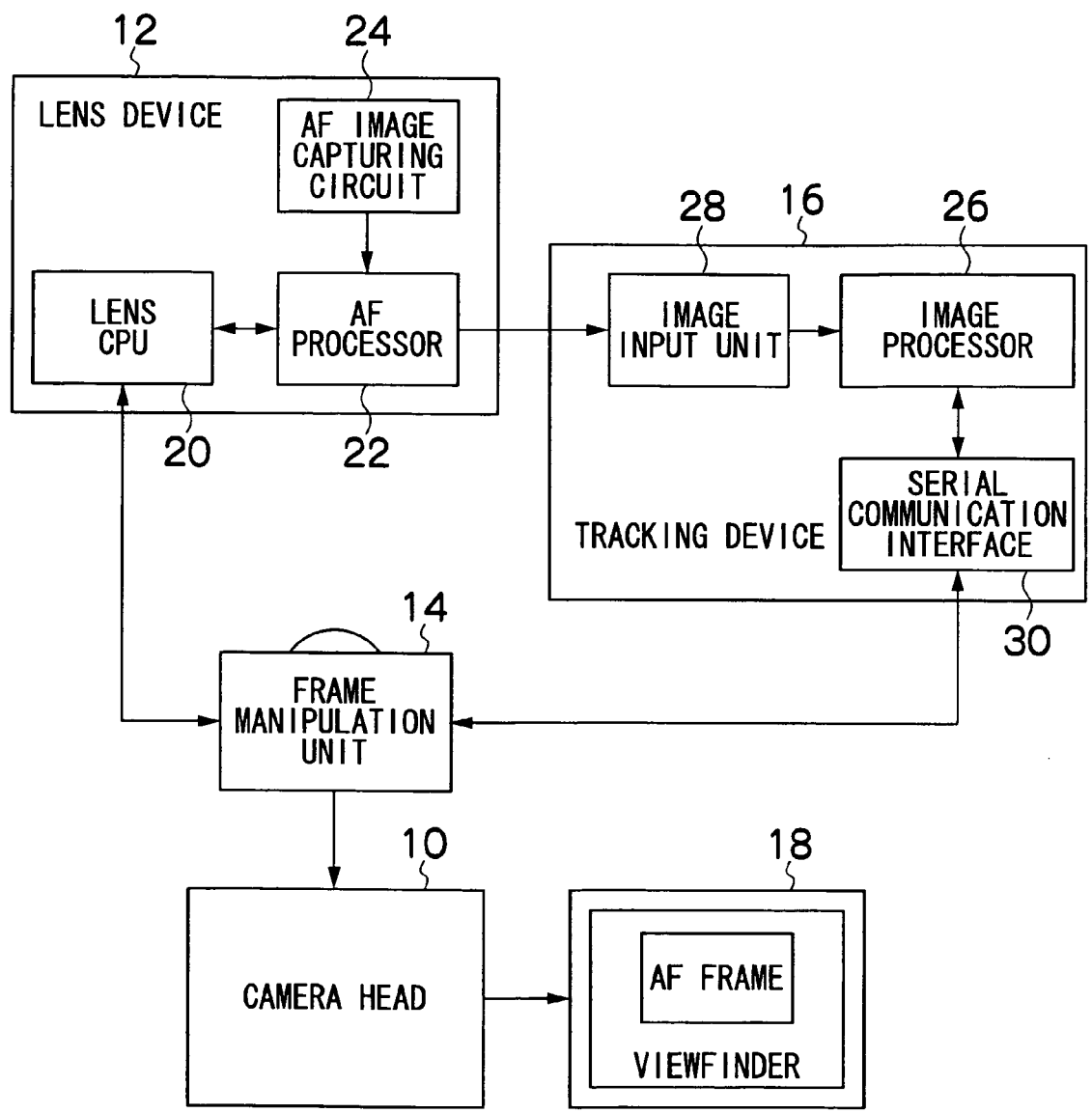
FIG. 1 is a block diagram illustrating the entire configuration of an imaging system employing an autofocus system according to the present invention.

FIG. 1 is a block diagram illustrating the overall configuration of an imaging system employing an autofocus system according to the present invention. The imaging system shown is, for example, used to capture video through a broadcast TV camera. FIG. 1 shows a camera head 10 in which the lens is interchangeable, a lens device 12 with a taking lens (optics) attached to the lens mount of the camera head 10, a frame manipulation unit 14, and a tracking device 16.

The camera head 10 is equipped with an imaging element (e.g., CCD), necessary signal processing circuits, and the like. Images focused by the taking lens of the lens device 12 are opto-electrically converted by the imaging element and then the resulting electrical signals are subjected to necessary operations in the signal processing circuits. The video signal generated by the signal processing circuits in a predetermined format is outputted from a video signal output terminal of the camera head 10 to external equipment. The camera head 10 is also equipped with a viewfinder (monitor) 18 for checking how the picture is composed, for example. The viewfinder 18 is configured to receive video signals from the camera head 10 and display on its screen realtime images (video) being captured by the camera head 10. The information displayed on the screen of the viewfinder 18 includes an AF frame indicative of the extent of an AF area, which is the region of interest for autofocus (AF).

The lens device 12 comprises a taking lens (optics), not shown, attached to the lens mount of the camera head 10. The taking lens images a subject onto the image plane of the imaging element of the camera head 10. The components of the taking lens includes movable portions for adjusting video capturing conditions, such as a focusing lens group, a zoom lens group, and an aperture. The movable portions are electrically powered by a motor (servo mechanism), which is not shown in the figure. For example, the focusing lens group and the zoom lens group travel along the optical axis, and the focus (the distance to the subject) is adjusted by moving the focusing lens group, while the focal length (zoom magnification) is adjusted by moving the zoom lens group. In a system involving an autofocus adjustment, as in this embodiment, at least the focusing lens group needs to be motorized while other movable portions may be actuatable only in a manual mode. If certain movable portions are motorized and actuated by an operator, their operations are controlled based on control signals outputted, according to the operator's operations, from an operation unit, not shown, (such as an operation unit of an controller connected to the lens device 12), but the details of which will be omitted.

The lens device 12 also includes, as shown in FIG. 1, a lens CPU 20 for performing centralized control over the entire lens device 12, an AF processor 22 for performing autofocus (AF) processing, and an AF image capturing circuit 24. The AF image capturing circuit 24 is provided in the lens device 12 in order to capture video signals for AF processing and comprises an imaging element (such as CCD) and processing circuits for outputting an output signal from the imaging element as a predetermined format video signal. As used herein, the imaging element in the AF image capturing circuit 24 is referred to as an AF imaging element and the video signal outputted from the AF image capturing circuit 24 is a brightness signal. The light from the subject incident onto the imaging element in the camera head 10 is split by a partially reflecting mirror, for example, placed in the light path of the taking lens and focused onto the image plane of the AF imaging element. The AF imaging element is configured such that the field of view and the distance to the subject associated with the imaging area of the AF imaging element match with those associated with the imaging area of the imaging element of the camera head 10, thus a subject image captured by the AF imaging element match with the one captured by the imaging element of the camera head 10. The fields of view of those imaging elements do not need to completely match each other. For example, the field of view of the AF imaging element may be large enough to encompass that of the imaging element of the camera head 10.

The AF processor 22 receives video signals from the AF image capturing circuit 24 and computes a focus evaluation value based on the video signals, which represents how high or low the contrast of the subject image is. For example, the video signal received from the AF imaging element is high-pass filtered to extract its high-frequency component signal and the part of the signal within the AF area, the region of interest for AF, is integrated for one screen (one frame) of image. Such an integrated value obtained for each screen of image represents how high or low the contract of the subject image is and is supplied to the lens CPU 20 as a focus evaluation value. The extent of the AF area is specified by the lens CPU 20 as described later.

The lens CPU 20 receives information on an AF frame (AF frame information) indicative of the extent (contour) of an AF area from the frame manipulation unit 14, as described later in detail, and presents the extent of AF frame specified by the AF frame information, as the AF area to the AF processor 22. The lens CPU 20 then receives from the AF processor 22 a focus evaluation value determined by the image (video signals) within the AF frame. In this manner, for each reception of one screen of video signals from the AF image capturing circuit 24 (for each determination of a focus evaluation value at the AF processor 22) the lens CPU 20 receives a focus evaluation value from the AF processor 22 and controls the focusing lens group such that the received focus evaluation value is greatest (maximum), that is, such that the contrast of the subject image within the AF area is highest. For example, a commonly known method for controlling the focusing lens group based on a focus evaluation value is a "hill-climbing algorithm", in which the focusing lens group moves in the direction that the focus evaluation value increases until the point where the focus evaluation value begins to decrease is detected, at which position the focusing lens group is positioned. In this manner, the system automatically focuses on the subject within the AF frame.

Figure 2:
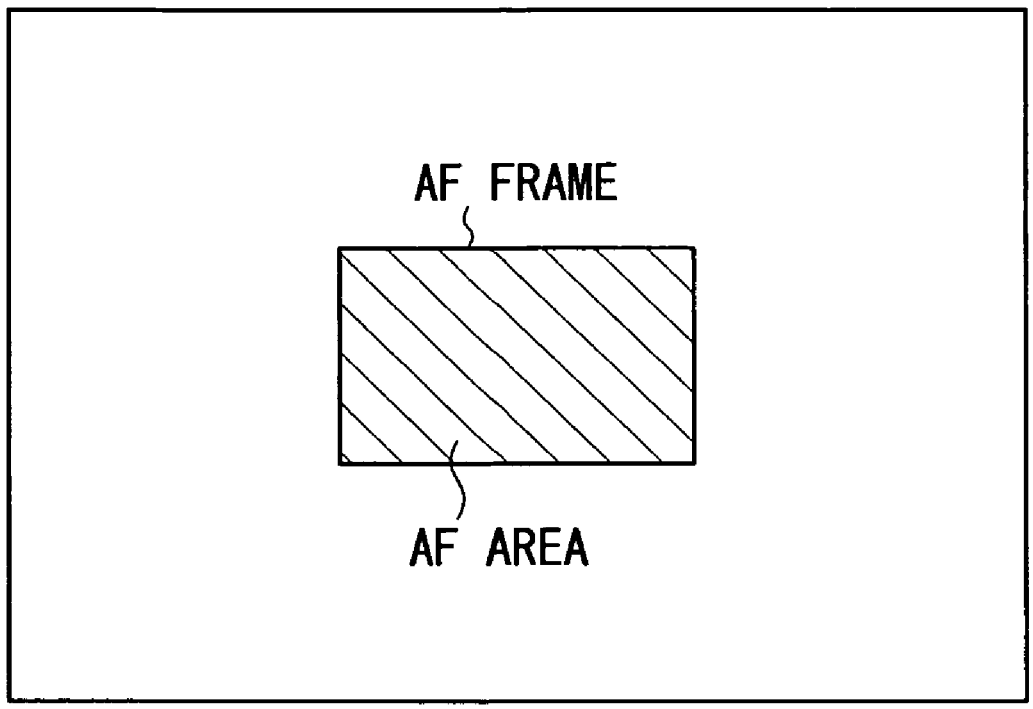
FIG. 2 shows an AF frame.

The frame manipulation unit 14 has manipulation components for the operator to specify the settings of the AF frame, such as the position, shape, and size of the AF frame. An AF frame herein refers to the contour of the AF area indicative of the region of interest for AF with respect to the field of view of, or an image to be captured through, the imaging element of the camera head 10, as shown in FIG. 2. The frame manipulation unit 14, when its manipulation components are maneuvered by the operator, sets or changes the settings, such as the position of the AF frame, according to the operation. In this embodiment, the shape of the AF frame is limited to a rectangle. The settings such as the position or size of the AF frame are changed through the use of manipulation components of the frame manipulation unit 14 such that with reference to the settings of the AF frame before manipulation, the amount of subsequent manipulation of the manipulation components is added to the previous setting. For example, the position of the AF frame is changed such that the AF frame is displaced in horizontal and vertical directions by the amount of rotation of the trackball and according to the rotating direction of the trackball. Also, if an AF point is defined as a point indicative of the position of an AF frame (the center of a rectangular AF frame in this embodiment) in the field of view (image to be captured), the position of the AF frame is determined by positioning the AF point.

On the other hand, during the time when the operator does not manipulate the manipulation components hence no changes are made to the settings of the AF frame by the operator, they are set or changed by AF frame information provided through the tracking device 16 as described later. Upon a request from the lens CPU 20, the frame manipulation unit 14 sends AF frame information indicative of the settings of the AF frame set or changed by the operator's operation or the AF frame information from the tracking device 16. Thus, the region of interest for AF is set to the AF frame area set or changed in the frame manipulation unit 14.

The tracking device 16 tracks an operator-specified object on the screen, moves the AF point as the object moves, and automatically changes the position of the AF frame. The AF frame is automatically changed as described above if no changes are made to the AF frame by the operator, while the AF frame is changed according to the operator's operation, when the operator has changed the AF frame, which overrides the changes made by the tracking device 16.

The frame manipulation unit 14 also sends the AF frame information indicative of the settings of the AF frame set or changed as described above to the camera head 10, which displays the AF frame on the viewfinder 18 at a corresponding position. Thus, the operator can recognize the position, shape, and size of the updated AF frame through viewing the viewfinder 18.

The tracking device 16 comprises an image processor 26, an image input unit 28, and a serial communication interface 30. The image input unit 28 receives video signals (brightness signals) captured by the AF image capturing circuit 24 through the AF processor 22, and transfers the part of the image (image data), within the field of view, specified by the image processor to the image processor 26.

The image processor 26 tracks the operator-specified object on the screen based on the image data received from the image input unit 28 with the aid of a pattern matching method or an interframe difference extraction method, and moves the AF point in keeping track of the movement of the object. Then, the image processor 26, sends the AF frame information indicative of the position of that AF point to the frame manipulation unit 14 via the serial communication interface 30 and specifies the AF point to automatically change the AF frame. Information other than AF frame information is also sent back and forth between the frame manipulation unit 14 and the image processor 26 via the serial communication interface 30.

Tracking processes performed in the image processor 26 utilizing a pattern matching method or an interframe difference extraction method will be described below. A pattern matching method detects an image that most closely resembles a preset and registered reference pattern image from among images captured by the image input unit 28. In this method, an object image specified by the operator is preset as the reference pattern image.

An interframe difference extraction method computes the difference (differential image) between one frame (one screen) of image most currently captured from the image input unit 28 and one frame of image captured pre-determined frames before the latest image, and detects the movement of the operator-specified object on the screen based on the differential image.

Although the pattern matching method enables a high-accuracy detection, it may not be able to respond fast enough if the object abruptly changes its position on the screen because the method requires more processing time than the interframe difference extraction method. Thus, the interframe difference extraction method is used when the object abruptly changes its position on the screen, otherwise the pattern matching method is used.

First, the tracking process using the pattern matching method will be described with reference to the flowchart of FIG. 3. The operator maneuvers the manipulation components of the frame manipulation unit 14 while viewing the video and the AF frame displayed on the screen of the viewfinder, encloses an object to be tracked inside the AF frame, and lets the system autofocus on the object. Then, the operator presses the "ENTER" button on the frame manipulation unit 14. This sends a command from the frame manipulation unit 14 to the image processor 26 telling it to set a reference pattern, then the image processor 26 reads out the AF frame information indicative of the settings of the current AF frame from the frame manipulation unit 14 through the serial communication interface 30, and captures the image data within the AF frame from the image input unit 28 (step S10). Then, the image processor 26 sets and registers (stores) that image as the reference pattern (step S12).

In the process of setting the reference pattern, the size of the reference pattern may be determined automatically depending on the type of the object rather than the size of the AF frame. For example, if the frame manipulation unit 14 is configured to have a certain switch by which the operator can select the type of the object and a person is selected as the object, an automatic setting feature of the size of the reference pattern to the average size of human faces sets the reference pattern with an appropriate size depending on the type of the object. However, since the image size of the object on the screen varies depending on the camera-to-subject distance (focus position) and the zoom magnification (focal length), it is necessary to obtain information on the focus position and focal length from the lens CPU 20 to change the size of the reference pattern depending on the obtained information. Besides the size of the reference pattern, the size of the AF frame may also be changed automatically depending on the type of the object.

Figure 3:
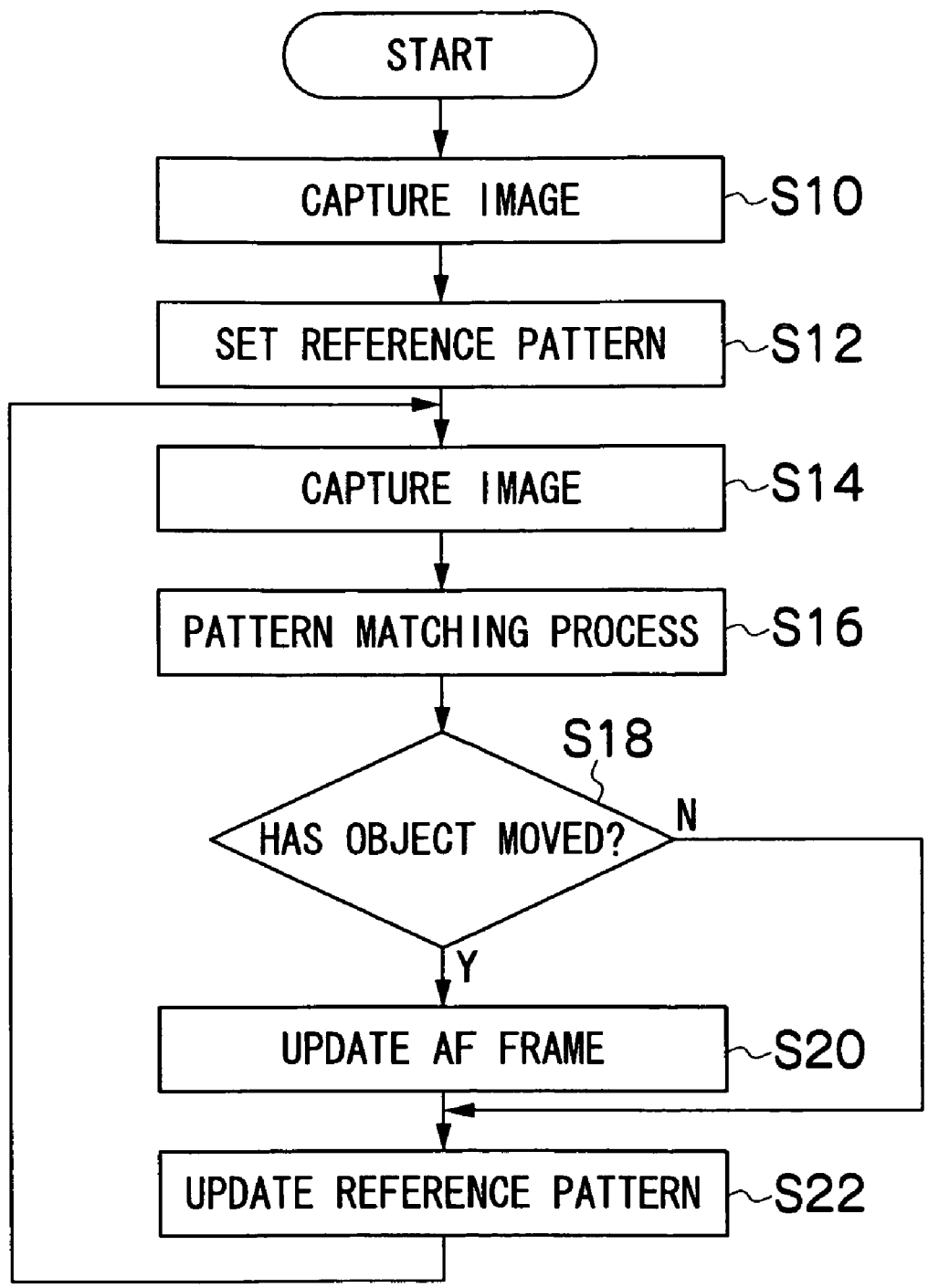
FIG. 3 is a flowchart illustrating a procedure of a tracking process using a pattern matching method.

The image processor 26 consequently repeats the process of the steps from S14 to S22 of FIG. 3. The image processor 26 first captures image data from the image input unit 28 which is a little larger than the reference pattern for both horizontal and vertical directions and has its center at the center of the currently set AF frame (step S14). Then, from among the captured images, the image processor 26 detects an image that most closely resembles the reference pattern using a known pattern matching method, and detects the on-screen position of the object set as the reference pattern (step S16). The image processor 26 consequently determines whether the object has moved or not on the screen based on the detected position of the object (step S18). If the result of the step S18 is YES, the image processor 26 moves the AF point by the same amount and in the same direction as the object has moved, and sends the AF frame information indicative of that AF point to the frame manipulation unit. This updates the settings of the AF frame, i.e., the position of the AF frame (step S20). If the result of the step S18 is NO, the step 22 is skipped.

Next, the image processor 26 updates the reference pattern image to the detected image by the pattern matching process (step S22), and the procedure returns to the step S14.

By updating the AF frame as described above, the position of the AF frame moves such that it tracks the object specified by the operator as a reference pattern as the object moves, allowing the system to keep focusing on the object specified by the operator.

Next, the tracking process using the interframe difference extraction method will be described with reference to the flowchart of FIG. 4. If the object specified in the process of setting of the reference pattern in the above described pattern matching method moves fast, the method may not respond fast enough to detect the fast moving object (reference pattern), and the AF point can be substantially misaligned with the object. For this reason, if the image processor 26 determines, during performing the tracking process using the pattern matching method, that the speed of the object moving on the screen exceeds a certain value, the image processor 26 switches to the tracking process using the interframe difference extraction method, and executes the following processes. The operator may also switch between the pattern matching method and interframe difference extraction method by a command from the operator (such as by operating a switch).

Figure 4:
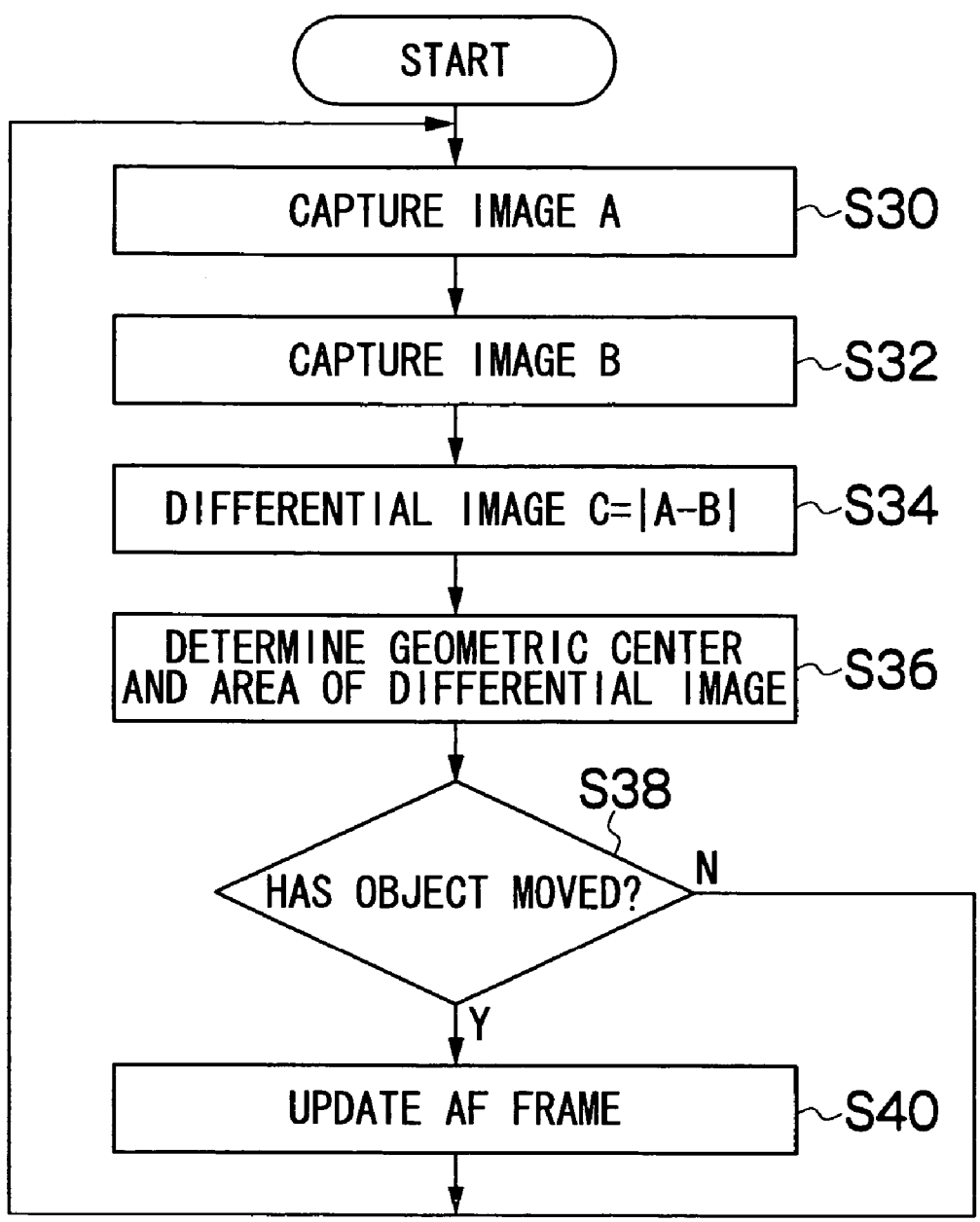
FIG. 4 is a flowchart illustrating a procedure of a tracking process using an interframe difference extraction method.

The image processor 26 starts the process of the interframe difference extraction method, then repeats the process of the steps from S30 to S40 of FIG. 4. The image processor 26 first captures one frame (one screen) of image data from the image input unit 28 (step S30). The captured image is designated as image A. The image processor 26 consequently captures one frame of image from the image input unit 28 a certain time after the image A was captured (step S32). The captured image is designated as image B.

The image data captured as images A and B only consist of a certain part of the image data of the entire field of view captured from the imaging area of the AF imaging element. For the first image acquisition, image data is acquired from a region that is a little larger than the reference pattern and has its center at the AF point, and for the second image acquisition and later, image data is acquired from a region that is a little larger than the area where a differential image, which will be described later, is detected (the area having pixels with a value 1). This allows the image processor 26 to ignore all but the specified moving object, resulting in reduction in image processing time.

Upon capturing images A and B, the image processor 26 computes absolute values of difference of the corresponding pixel values between the image A and image B, and derives image data of the differential image C between the images A and B (step S34). Then, the image data of the differential image C is binarized and the geometric center and the area of the region having pixels with pixel value 1 are determined (step S36). Next, the image processor 26 determines whether the object has moved or not based on whether the area is greater than a predetermined threshold and the geometric center has moved or not relative to the previous detected geometric center (step S38). If the result of the step S38 is YES, the image processor 26 moves the AF point by the same amount and in the same direction as the geometric center has moved, and sends the AF frame information indicative of the AF point to the frame manipulation unit 14. This updates the settings of the AF frame, i.e., the position of the AF frame (step S40). Upon completion of the process of the step 40, the procedure returns to the step 30. If the result of the step S38 is NO, the procedure skips the step 40 and returns to the step 30.

If the image processor 26 determines, during performing the tracking process using the interframe difference extraction method as described above, that the moving speed of the object (the moving speed of the geometric center) decreases below a certain value, the image processor 26 switches to the tracking process using the pattern matching method.

In the above embodiments, the field frequency (vertical synchronization frequency) of the video signal captured by the AF image capturing circuit (AF imaging element) of the lens device 12 does not need to be the same as that of the video signal captured by the imaging element of the camera head. Increased field frequency of the video signal at the AF image capturing circuit 24 improves the adaptability to fast moving objects.

In the above embodiments, since the tracking process using the pattern matching method may not be able to detect an object if the operator is performing a fast zoom operation or the object being tracked moves fast before or after the tracking process, the system may switch to the tracking process using the interframe difference extraction method automatically or manually. For example, the pattern matching method and the interframe difference extraction method can be automatically switched by determining whether a fast zoom operation is being performed or not based on whether the zoom magnification (focal length) is changing or not at a faster rate than a certain value, or by determining whether the object moves fast or not before or after the tracking process based on whether the focus position (shooting distance) is changing or not at a faster rate than a certain value.

In the above embodiments, while only one reference pattern (object) is registered and set, multiple reference patterns (objects) may be registered and set, and any of these multiple reference patterns set can be selected by a switch, for example, as a reference pattern to be actually used. This is useful in the case that the operator switches from person to person to be autofocused in a talk show where the operator takes a video of a plurality of persons simultaneously or alternately.

In the above embodiments, while the lens device 12, the frame manipulation unit 14, and the tracking device 16 are shown to be separate devices, any two or all of them may be integrated into a single device. Also, in the above embodiments, while the manipulation components used in the process performed through the tracking device 16 (e.g., the "ENTER" switch for setting an object, and the like) are provided on the frame manipulation unit 14, they may be provided on the tracking device 16.

In the above embodiments, while AF video signals are obtained from the AF-dedicated imaging element separate from the imaging element in the camera head 10, video signals from the imaging element in the camera head 10 may be used for AF purposes. However, if the camera head 10 supports a high-definition (HD) television system, providing AF video signals from the AF-dedicated imaging element as shown in the above embodiments is advantageous in terms of downsizing and power saving since autofocusing can be performed without using such HD signals.

What is claimed is:

1. An autofocus system for controlling the focus of a taking lens by specifying a subject to be autofocused within an AF area, which is part of the field of view of a camera, and automatically focusing on the subject, comprising:

a target subject specifying device which specifies a target subject to be focused;

a target subject movement detection device which detects the movement of the target subject specified by the target subject specifying device utilizing a plurality of movement detection methods, within the field of view, wherein the target subject movement detection device switches between the movement detection methods based on a parameter; and an AF-area altering device which alters the extent of the AF area to track the movement of the target subject detected by the target subject movement detection device, wherein the target subject movement detection device captures a subject image in the field of view of the camera through an imaging device and detects the movement of the target subject based on the captured image, wherein the target subject movement detection device comprises a storing device which captures a target subject image specified by the target subject specifying device through the imaging device and stores the target subject image, wherein a first movement detection method includes detecting a pattern of the image stored in the storing device from among the images of the field of view of the camera captured through the imaging device.

2. The autofocus system according to claim 1, wherein the autofocus system performs focusing based on the contrast of an image of the AF area captured through the imaging device.

3. The autofocus system according to claim 2, wherein the imaging device is a separate imaging device from a primary imaging device of the camera.

4. The autofocus system according to claim 1, wherein the imaging device is a separate imaging device from a primary imaging device of the camera.

5. The autofocus system according to claim 1, wherein the target subject is set as a reference pattern and the pattern of the image stored in the storing device is detected based on an image that most closely resembles the reference pattern from among the images in the field of view of the camera captured through the imaging device.

6. An autofocus system for controlling the focus of a taking lens by specifying a subject to be autofocused within an AF area, which is part of the field of view of a camera, and automatically focusing on the subject, comprising:

a target subject specifying device which specifies a target subject to be focused:

a target subject movement detection device which detects the movement of the target subject specified by the target subject specifying device utilizing a plurality of movement detection methods, within the field of view, wherein the target subject movement detection device switches between the movement detection methods based on a parameter; and an AF-area altering device which alters the extent of the AF area to track the movement of the target subject detected by the target subject movement detection device, wherein the target subject movement detection device captures a subject image in the field of view of the camera through an imaging device and detects the movement of the target subject based on the captured image, wherein the imaging device is a separate imaging device from a primary imaging device of the camera.

7. An autofocus system for controlling the focus of a taking lens by specifying a subject to be autofocused within an AF area, which is part of the field of view of a camera, and automatically focusing on the subject, comprising:

a target subject specifying device which specifies a target subject to be focused;

a target subject movement detection device which detects the movement of the target subject specified by the target subject specifying device utilizing a plurality of movement detection methods, within the field of view, wherein the target subject movement detection device switches between the movement detection methods based on a parameter; and an AF-area altering device which alters the extent of the AF area to track the movement of the target subject detected by the target subject movement detection device, wherein the target subject movement detection device captures a subject image in the field of view of the camera through an imaging device and detects the movement of the target subject based on the captured image, wherein the autofocus system performs focusing based on the contrast of an image of the AF area captured through the imaging device wherein the imaging device is a separate imaging device from a primary imaging device of the camera.

8. An autofocus system for controlling the focus of a taking lens by specifying a subject to be autofocused within an AF area, which is part of the field of view of a camera, and automatically focusing on the subject, comprising:

a target subject specifying device which specifies a target subject to be focused;

a target subject movement detection device which detects the movement of the target subject specified by the target subject specifying device utilizing a plurality of movement detection methods, within the field of view, wherein the target subject movement detection device switches between the movement detection methods based on a parameter; and an AF-area altering device which alters the extent of the AF area to track the movement of the target subject detected by the target subject movement detection device, wherein the parameter is the speed of the target subject, wherein the speed of the target subject is determined.

9. The autofocus system according to claim 8, wherein if the speed of the target subject is below a predetermined value, then a first movement detection method is used and if the speed of the target subject is above the predetermined value, then a second movement detection method is used.

* * * * *